(12) United States Patent
Kamimura et al.

(10) Patent No.: US 9,713,949 B2
(45) Date of Patent: Jul. 25, 2017

(54) VEHICLE BODY STRUCTURE

(71) Applicant: TOYOTA JIDOSHA KABUSHIKI KAISHA, Toyota-shi, Aichi-ken (JP)

(72) Inventors: Shinya Kamimura, Toyota (JP); Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/850,379

(22) Filed: Sep. 10, 2015

(65) Prior Publication Data

US 2016/0075216 A1   Mar. 17, 2016

(30) Foreign Application Priority Data

Sep. 16, 2014   (JP) .................................. 2014-188279

(51) Int. Cl.
*B60J 5/10* (2006.01)
*B60J 5/04* (2006.01)
*B60J 1/18* (2006.01)

(52) U.S. Cl.
CPC ............. *B60J 5/107* (2013.01); *B60J 5/101* (2013.01); *B60J 1/18* (2013.01); *B60J 5/0481* (2013.01)

(58) Field of Classification Search
CPC ..... B60J 1/004; B60J 1/006; B60J 1/18; B60J 1/10; B60J 5/10; B60J 5/101; B60J 5/107
USPC ......... 296/146.1–146.3, 146.5, 146.6, 146.8, 296/146.15, 201, 76, 56
See application file for complete search history.

(56) References Cited

U.S. PATENT DOCUMENTS

| | | | |
|---|---|---|---|
| 3,274,740 A | | 9/1966 | Hall et al. |
| 4,261,610 A | * | 4/1981 | Inamoto ................... B60J 5/101 296/146.2 |
| 4,709,957 A | * | 12/1987 | Ohya ..................... B60H 1/265 296/146.3 |
| 4,773,700 A | * | 9/1988 | Sannomiya .............. B60J 5/107 296/106 |
| 4,822,098 A | * | 4/1989 | Vogt ........................ B60J 5/101 296/146.5 |

(Continued)

FOREIGN PATENT DOCUMENTS

| | | |
|---|---|---|
| JP | S59-53118 U | 4/1984 |
| JP | S63-151518 A | 6/1988 |

(Continued)

OTHER PUBLICATIONS

Partial English translation of Oct. 18, 2016 Office Action issued in Japanese Patent Application No. 2014-188279.

*Primary Examiner* — Gregory Blankenship
(74) *Attorney, Agent, or Firm* — Oliff PLC

(57) ABSTRACT

A vehicle body structure includes a frame structure portion configured to define an opening; the frame structure portion including a first panel having a first joint portion, a second panel having a second joint portion, and a first adhesive portion that adheres to the first joint portion and the second joint portion; a windowpane that is provided on a vehicle outside of the opening and that covers the opening; and a second adhesive portion that adheres to the first panel, the second panel, and the windowpane, wherein at least one of the first panel and the second panel is made of resin, the second adhesive portion is arranged closing off or covering an open end of a gap in a joint between the first panel and the second panel, and the first adhesive portion is arranged within the gap.

11 Claims, 9 Drawing Sheets

(56) References Cited

U.S. PATENT DOCUMENTS

| | | | | |
|---|---|---|---|---|
| 4,886,312 A * | 12/1989 | Asoh | ................ | B60J 1/1884 |
| | | | | 296/146.2 |
| 6,814,385 B2 * | 11/2004 | Fujiwara | ............. | B60J 10/70 |
| | | | | 296/146.15 |
| 7,828,365 B2 * | 11/2010 | Kiriakou | ............ | B60J 5/107 |
| | | | | 296/146.1 |
| 8,182,025 B2 * | 5/2012 | Auchter-Bruening | ..... | B60J 7/04 |
| | | | | 296/191 |
| 8,226,151 B2 * | 7/2012 | Miyake | ............. | B60J 5/101 |
| | | | | 296/106 |
| 2010/0156138 A1 * | 6/2010 | Terai | ................ | B60J 1/007 |
| | | | | 296/146.3 |
| 2010/0270827 A1 * | 10/2010 | Krachler | ............ | B60J 5/101 |
| | | | | 296/146.2 |
| 2011/0241376 A1 * | 10/2011 | Igura | ................ | B60J 5/101 |
| | | | | 296/146.3 |
| 2016/0075216 A1 * | 3/2016 | Kamimura | ......... | B60J 5/107 |
| | | | | 296/146.2 |
| 2016/0167492 A1 * | 6/2016 | Ikeda | ................ | B60J 5/10 |
| | | | | 296/146.2 |

FOREIGN PATENT DOCUMENTS

| | | |
|---|---|---|
| JP | H04-116208 U | 10/1992 |
| JP | 2010260519 A | 11/2010 |
| JP | 2011-219000 A | 11/2011 |
| JP | 2013-010436 A | 1/2013 |
| JP | 2013-220688 A | 10/2013 |
| JP | 2014-019359 A | 2/2014 |
| JP | 2014-076707 A | 5/2014 |
| JP | 2014-104790 A | 6/2014 |
| JP | 2014-131896 A | 7/2014 |

* cited by examiner

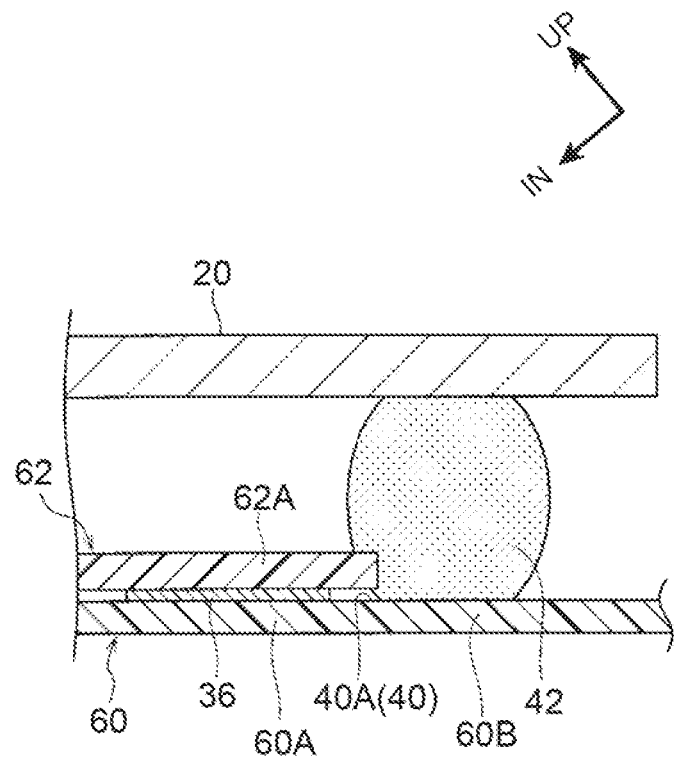

VEHICLE BODY STRUCTURE

INCORPORATION BY REFERENCE

The disclosure of Japanese Patent Application No. 2014-188279 filed on Sep. 16, 2014 including the specification, drawings and abstract is incorporated herein by reference in its entirety.

BACKGROUND OF THE INVENTION

1. Field of the Invention

The invention relates to a vehicle body structure.

2. Description of Related Art

Japanese Patent Application Publication No. 2013-220688 (JP 2013-220688 A) describes technology related to a back door made of resin, illustrated in FIG. 4 of that publication, as one example of a vehicle body structure. In brief, with the related art, a frame portion of the back door is formed by joining together a door inner panel and a door outer panel, both made of resin, by adhesive. Further, a rear window glass is joined to an edge portion of the door outer panel by adhesive. To simplify the description, the former adhesive will be referred to as a "first adhesive", and the latter adhesive will be referred to as a "second adhesive".

When examining the joint structure of the back door from the viewpoint of waterproofness, water that has gotten in from the outside the rear window glass is kept out by the second adhesive. However, condensation water that adheres to the inside of the rear window glass is unable to be kept out by the second adhesive, and therefore penetrates to the first adhesive side. However, with the related art described above, a terminal portion of the edge portion of the door outer panel is curved toward the first adhesive side, so the condensation water is inhibited to some extent from penetrating to the first adhesive side by this curved portion.

With the related art described above, condensation water is thought to be inhibited to some extent from penetrating to the first adhesive side by the curved portion. However, in cases such as when vibration is transmitted to the door inner panel and the door outer panel due to road surface input, a gap is created between a tip end of the curved portion and the door inner panel, and as a result, condensation water may penetrate to the first adhesive side.

SUMMARY OF THE INVENTION

The invention thus provides a vehicle body structure capable of inhibiting both water from outside a windowpane, and condensation water that adheres to the inside of the windowpane, from getting in.

A first aspect of the invention relates to a vehicle body structure includes a frame structure portion configured to define an opening, the frame structure portion including a first panel having a first joint portion, a second panel having a second joint portion, and a first adhesive portion that adheres to the first joint portion and the second joint portion; a windowpane that is provided on a vehicle outside of the opening and that covers the opening; and a second adhesive portion that adheres to the first panel, the second panel, and the windowpane, wherein at least one of the first panel and the second panel is made of resin, the second adhesive portion is arranged closing off or covering an open end of a gap in a joint between the first panel and the second panel, and the first adhesive portion is arranged within the gap.

Here, the first adhesive portion is spread out in a state pressed between the first joint portion and the second joint portion. In this aspect of the invention, the second adhesive portion is arranged closing off or covering an open end of a gap in a joint between first panel and the second panel, and within which the first adhesive portion is arranged, and this second adhesive portion adheres to the first panel and the second panel, and the windowpane. As a result, water that has gotten in from outside the windowpane and condensation water that adheres to the inside of the windowpane are both able to be stopped by the second adhesive portion. That is, water is physically prevented from getting into the gap formed at the joint between the first panel and the second panel by the second adhesive portion.

As described above, the vehicle body structure according to this aspect of the invention has a beneficial effect in which both water from outside the windowpane and condensation water that adheres to the inside of the windowpane are able to be effectively prevented or inhibited from getting in.

In the aspect of the example embodiment described above, the first adhesive portion may be a structural adhesive.

According to this structure, the first adhesive portion is a structural adhesive, so high rigidity is able to be obtained. Therefore, the frame structure portion is able to have high rigidity even if the weight of the vehicle is reduced by making at least one of the first panel and the second panel out of resin.

This structure has a beneficial effect in which high rigidity of the frame structure portion is able to be ensured without adding a metal reinforcing structure, and thus the support rigidity of the windowpane is able to be increased, while reducing the weight of the vehicle.

In the aspect of the invention described above, water resistance of the second adhesive portion may be higher than the water resistance of the first adhesive portion.

According to this structure, the water resistance of the second adhesive portion is higher than the water resistance of the first adhesive portion, so water that has gotten in from outside the windowpane and condensation water that adheres to the inside of the windowpane are able to be prevented from getting into the gap formed at the joint between the first panel and the second panel. That is, the second adhesive portion serves as a water stop.

The structure described above has beneficial effects in which water is able to be physically prevented from getting into the gap formed at the joint between the first panel and the second panel by the second adhesive portion, and water is able to be stopped by the property (physical property) of the second adhesive portion. In particular, the vehicle body structure with the first adhesive portion made of a structural adhesive and the second adhesive portion having higher water resistance than the water resistance of the first adhesive portion, is extremely advantageous in that interfacial peeling between the structural adhesive and the first panel or the second panel is able to be prevented by the second adhesive portion effectively preventing or inhibiting water from getting in.

In the aspect of the invention described above, the first panel may include an extended portion that extends in a direction toward an end portion of the windowpane via a stepped portion from the first joint portion, the extended portion may be arranged such that the open end is positioned between an end portion of the second joint portion and the stepped portion, and the second adhesive portion may adhere to the end portion of the second joint portion, the extended portion, and the windowpane.

According to this structure, the open end of the gap described above is arranged between the end portion of the second joint portion and the stepped portion of the first panel, when the second joint portion of the second panel is in a state joined to the first joint portion of the first panel by the first adhesive portion. In this state, the second adhesive portion adheres to the end portion of the second joint portion, the extended portion of the first panel and the windowpane, and closes off or covers the open end of the gap. In this structure, a step does not easily form between the extended portion of the first panel and the second joint portion of the second panel, so these are able to be made flush by setting the height of the step. Consequently, a worker is able to easily arrange the second adhesive portion on the extended portion of the first panel and the second joint portion of the second panel.

This structure has a beneficial effect in which workability with respect to the application of the second adhesive portion is able to be improved, and the work time of this application is able to be shortened. The application of the second adhesive portion is the process before assembling the windowpane to the first panel and the second panel.

In the aspect of the invention described above, the first panel may include an extended portion that is adjacent to the first joint portion, and be arranged on the same plane as the first joint portion, and the open end of the gap may be arranged between an end portion of the second joint portion and the first joint portion, and the second adhesive portion may adhere to the end portion of the second joint portion, the extended portion, and the windowpane.

According to this structure, the extended portion of the first panel and the second joint portion of the second panel are able to be joined, together with the windowpane, by the second adhesive portion, even if the first panel does not undergo a process to form a step or the like thereon. Therefore, a processing operation of the door first panel is able to be omitted.

As a result, this structure has a beneficial effect in which productivity is able to be improved, and the cost is able to be reduced accordingly.

In the aspect of the invention described above, the first joint portion and the second joint portion may be arranged on the same plane across the gap, the first joint portion and the second joint portion may be joined together by the first adhesive portion being filled in a portion or all of the gap, and the second adhesive portion adheres to the first joint portion, the second joint portion, and the windowpane.

According to this structure, water is able to be inhibited or prevented from penetrating to the first adhesive portion side, even if the first joint portion of the first panel and the second joint portion of the second panel do not overlap. Also, in this case, the first joint portion and the second joint portion are able to be made flush, so a worker is able to easily arrange the second adhesive portion on the first joint portion of the first panel and the second joint portion of the second panel. Furthermore, neither the first joint portion of the first panel nor the second joint portion of the second panel need to undergo special processing, so a processing operation of the panel is able to be omitted.

In addition, the positional relationship of the first adhesive portion and the second adhesive portion is such that they overlap when viewed from the windowpane side, so an effect in which the second adhesive portion directly adds to the joining (adhering) effect of the first joint portion and the second joint portion by the first adhesive portion is able to be obtained. That is, the gap between the first joint portion and the second joint portion is set narrow, so even if the first adhesive portion is filled into the gap, the adhesion range (area) thereof is limited. However, the second adhesive portion joins (adheres) the first joint portion and the second joint portion together in a position overlapping with the first adhesive portion when viewed from the windowpane side, so the second adhesive portion is able to add to the adhesive force of the first adhesive portion.

Thus, according to the second variation of this example embodiment, the joining force (adhesive force) between the first joint portion and the second joint portion by the first adhesive portion is able to be reinforced by the second adhesive.

In the aspect of the invention described above, the first panel may include a vertical wall portion that is bent toward the windowpane from an end portion of the first joint portion, the open end of the gap may be arranged between an end portion of the second joint portion and the vertical wall portion, and the second adhesive portion may adhere to the vertical wall portion, the end portion of the second joint portion, and the windowpane.

According to this structure, the first panel is provided with the vertical wall portion that is bent from the end portion of the first joint portion, so this vertical wall portion is able to be used as a water stop wall.

Therefore, according to this structure, water that gets in from outside the windowpane and condensation water that adheres to the inside surface of the windowpane is able to be effectively inhibited or prevented from penetrating to the first adhesive portion side, while the cost required for the second adhesive portion is able to be kept down.

In the aspect of the invention described above, the second adhesive portion may be an adhesive, and the second adhesive portion may be arranged closing off the open end of the gap.

According to this structure, the second adhesive portion does not need to be filled into the gap, so the amount of second adhesive portion that is applied (used) is able to be reduced.

Therefore, this structure has a beneficial effect in which the water stop member is able to be eliminated, so the cost is able to be reduced accordingly.

In the aspect of the invention described above, the second adhesive portion may be an adhesive, and the second adhesive portion may be filled in the gap from the open end of the gap.

According to this structure, the second adhesive portion that is an adhesive is filled inside the gap from the open end of the gap, so the adhesion area of the first panel and the second panel increases by that amount.

Therefore, this structure has a beneficial effect in which the joining strength between the first panel and the second panel is able to be increased.

In the aspect of the invention described above, the second adhesive portion may include an elastic body that is arranged between the first panel and the second panel, and the windowpane; a first adhesive member that adheres to the elastic body and the windowpane, and seals a gap between the elastic body and the windowpane; and a second adhesive member that seals a gap between the elastic body and the first panel, and a gap between the elastic body and the second panel.

According to this structure, road surface input transmitted to the frame structure portion when the vehicle is traveling is damped by the elastic body.

Therefore, this structure has a beneficial effect in which vibration of the windowpane when the vehicle is traveling is able to be effectively suppressed.

In the aspect of the invention described above, a dam member may be provided farther on an end portion side of the windowpane than the second adhesive portion, and may seal a gap between the first panel and the windowpane.

According to this structure, if water from outside the windowpane tries to get in, this water is first inhibited from getting in by the dam member.

Therefore, this structure has a beneficial effect in which water from outside the windowpane is able to be more effectively prevented from getting in (i.e., the water penetration inhibiting effect is further increased).

In the aspect of the invention described above, the first panel may be a door inner panel that is made of resin, the door inner panel being a part of a back door and facing a vehicle interior, the second panel may be a door outer panel that is made of resin, the door outer panel being a part of the back door and facing a vehicle exterior, and the windowpane may be a rear window glass of the back door.

According to this structure, the operation of the aspect of the invention described above is able to be obtained for a back door. That is, water that gets in from outside the rear window glass and condensation water that adheres to the inside of the rear window glass are stopped by the second adhesive portion that is arranged closing off or covering the open end of the gap formed at the joint between the first panel and the second panel, and that adheres to the door inner panel and the door outer panel, and the windowpane together.

Therefore, this structure has a beneficial effect in which water that gets in from outside the rear window glass and condensation water that adheres to the inside of the rear window glass are able to be effectively inhibited or prevented from penetrating to the side with the first adhesive portion that joins the door inner panel and the door outer panel together. Furthermore, this structure has a beneficial effect in which the effects obtained by the aspects of the invention are able to be obtained for a back door.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is an enlarged sectional view corresponding to FIG. 3, which shows a frame format of a joint structure according to a first variation of a second example embodiment of the invention;

DETAILED DESCRIPTION OF EMBODIMENTS

Figure 1:
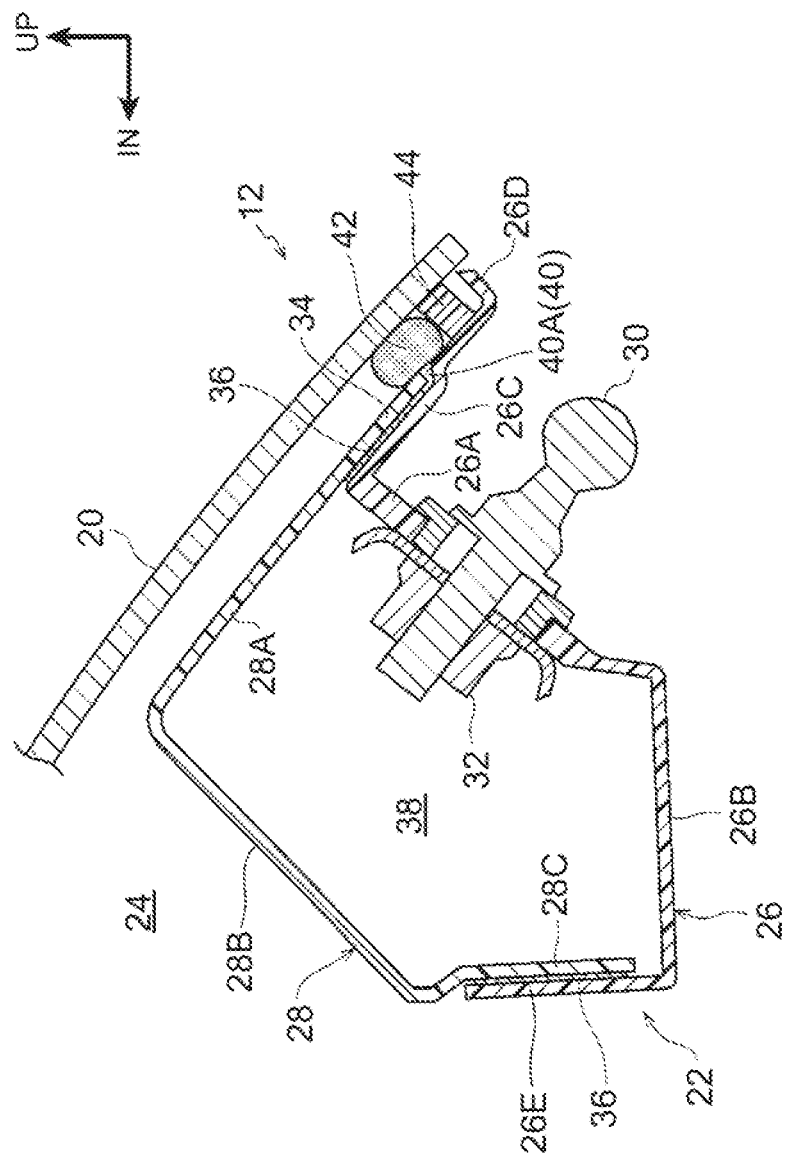
FIG. 1 is an enlarged sectional view taken along line 1-1 in FIGS. 4A and 4B, of a side portion sectional structure of a joint structure of a back door according to a first example embodiment of the invention.

Hereinafter, a first example embodiment of the vehicle body structure according to the invention will be described with reference to FIGS. 1 to 4. In the drawings, arrow FR indicates a vehicle front side, and arrow UP indicates a vehicle upper side. Further, arrow IN indicates the inside in a vehicle width direction.

Figure 4A:
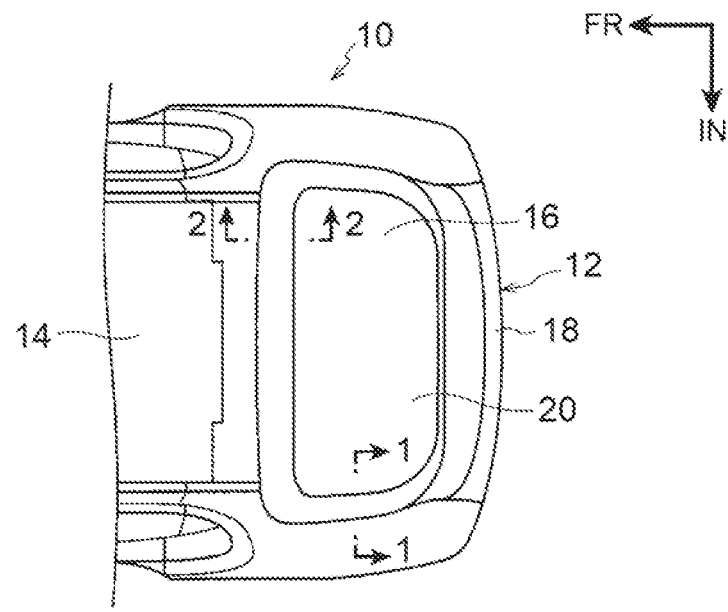
FIG. 4A is a plan view of the exterior of a rear portion of a vehicle provided with a back door to which the joint structure shown in FIGS. 1 and 2 has been applied.
Figure 4B:
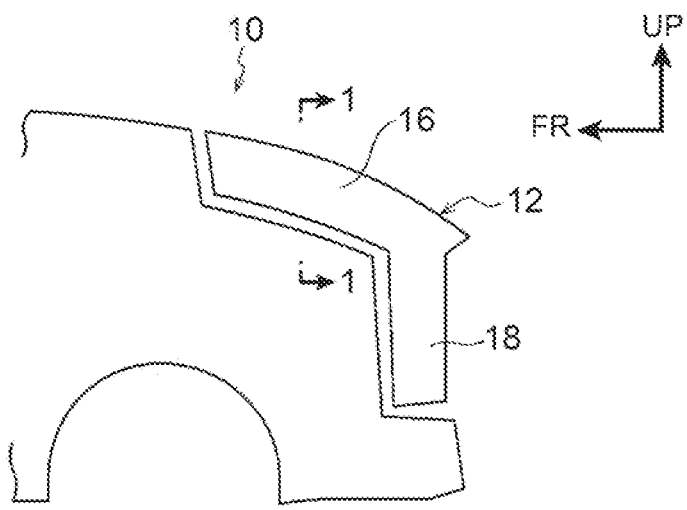
FIG. 4B is a side view of the exterior of the rear portion of the vehicle provided with a back door to which the joint structure shown in FIGS. 1 and 2 has been applied.

FIG. 4A is a plan view schematically showing a rear portion of a vehicle provided with a back door according to this example embodiment. Also, FIG. 4B is a side view schematically showing the rear portion of the vehicle. As shown in these drawings, a back door 12 for opening and closing a luggage compartment, not shown, provided in a rear end portion of the vehicle 10 is provided on this rear end portion in a manner able to open and close in a vehicle vertical direction around an upper edge portion of the rear end portion.

This back door 12 has a general L-shape in a vehicle side view, and is formed by a door upper portion 16 that extends gently toward a vehicle rear side from a rear end portion of a roof panel 14, and a door lower portion 18 that extends toward a vehicle lower side from a rear end portion of the door upper portion 16. The door upper portion 16 to which a rear window glass 20 is mounted will be described in detail later.

Figure 2:
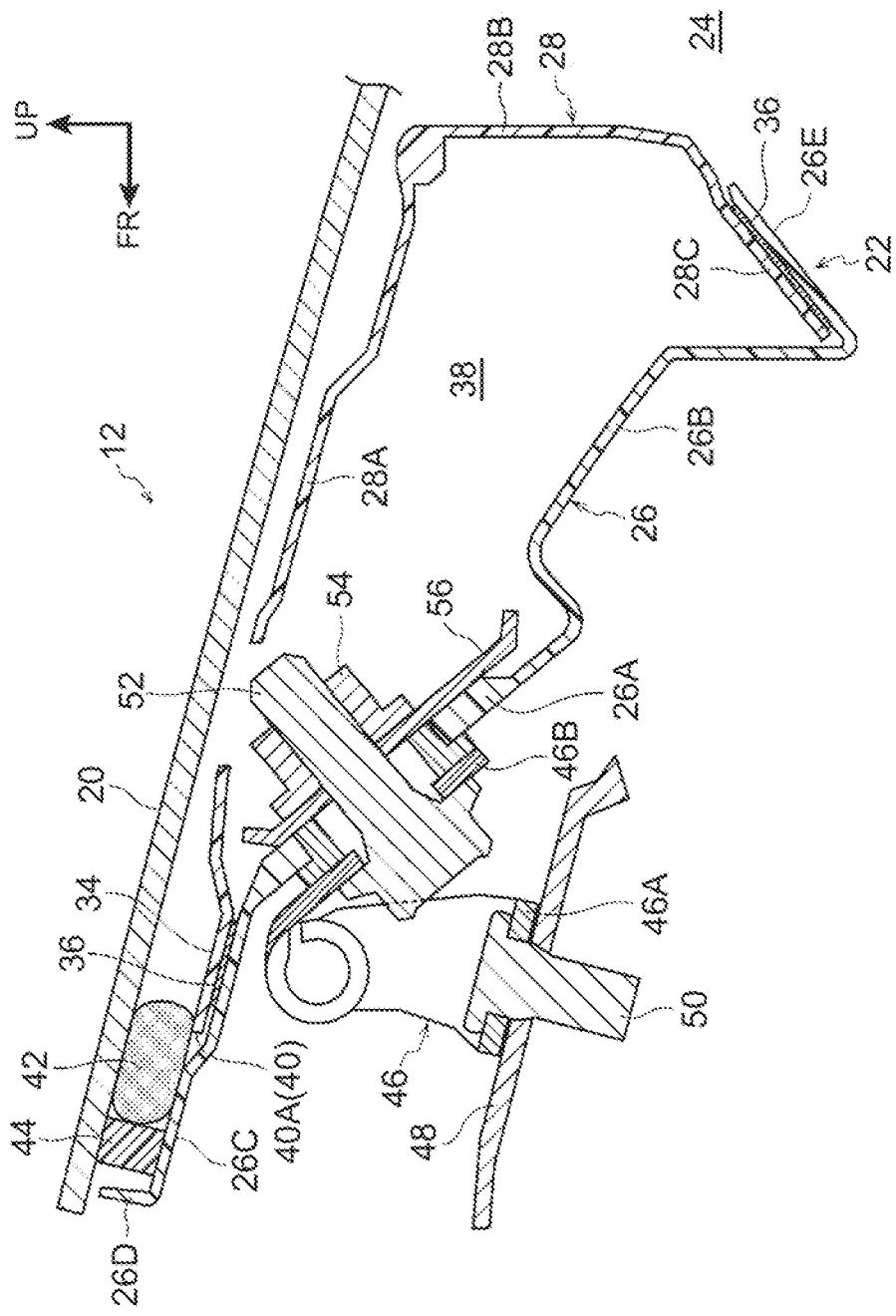
FIG. 2 is an enlarged sectional view taken along line 2-2 in FIG. 4A, of an upper sectional structure of the joint structure of the back door according to the first example embodiment.

As shown in FIGS. 1 and 2, the door upper portion 16 includes a frame structure portion 22 formed in a generally rectangular frame-shape, and a rear window glass 20 as a windowpane that is supported by the frame structure portion 22 and covers an opening 24 formed in the frame structure portion 22. The rear window glass 20 has a generally rectangular flat plate shape that is gently curved toward the vehicle outside.

FIG. 1 is a sectional view of a side portion of the frame structure portion 22 cut in the vehicle width direction, and FIG. 2 is a sectional view of an upper portion of the frame structure portion 22 cut in the vehicle longitudinal direction. Hereinafter, the structure of the frame structure portion 22 will be described with reference mainly to FIG. 1.

The frame structure portion 22 includes a door inner panel 26 as a first panel arranged on the vehicle inside, and a door outer panel 28 as a second panel arranged on the vehicle outside. The door inner panel 26 and the door outer panel 28 are both made of resin. More specifically, the door inner panel 26 and the door outer panel 28 are made of CFRP (carbon-fiber-reinforced plastic).

The door outer panel 28 includes an outer side upper wall portion 28A arranged parallel to the rear window glass 20, an outer side side wall portion 28B that is bent at a substantially right angle in a direction away from the rear window glass 20 from an end portion on the inside of the outer side upper wall portion 28A in the vehicle width direction, and an outer side lower wall portion 28C that is bent at an obtuse angle toward the vehicle width direction outside and extends toward the vehicle lower side from an end portion on the extending direction side of the outer side side wall portion 28B.

The door inner panel 26 includes an inner side side wall upper portion 26A arranged to the outside of the outer side side wall portion 28B in the vehicle width direction and parallel to the outer side side wall portion 28B, and an inner side side wall lower portion 26B that extends in an L-shape from an end portion on the vehicle lower side of the inner side side wall upper portion 26A. An inner side upper wall portion 26C is provided by the inner side side wall upper portion 26A extending to the outer side upper wall portion 28A and being bent toward the outside in the vehicle width direction. An outer end portion 26D is provided by the door inner panel 26 being bent at a substantially right angle toward the rear window glass 20 side, on an end portion on the outer side of the inner side upper wall portion 26C in the vehicle width direction. Furthermore, an inner side lower wall portion 26E is provided by the inner side side wall lower portion 26B extending to the outer side lower wall portion 28C and being bent toward the vehicle upper side and the inside in the vehicle width direction. A ball joint 30 of a damper stay, not shown, in which a male thread is formed on a tip end portion, is fastened (fixed) to the inner side side wall upper portion 26A by a nut 32. Therefore, the inner side side wall upper portion 26A is formed with a thicker plate thickness than other portions.

Figure 3:
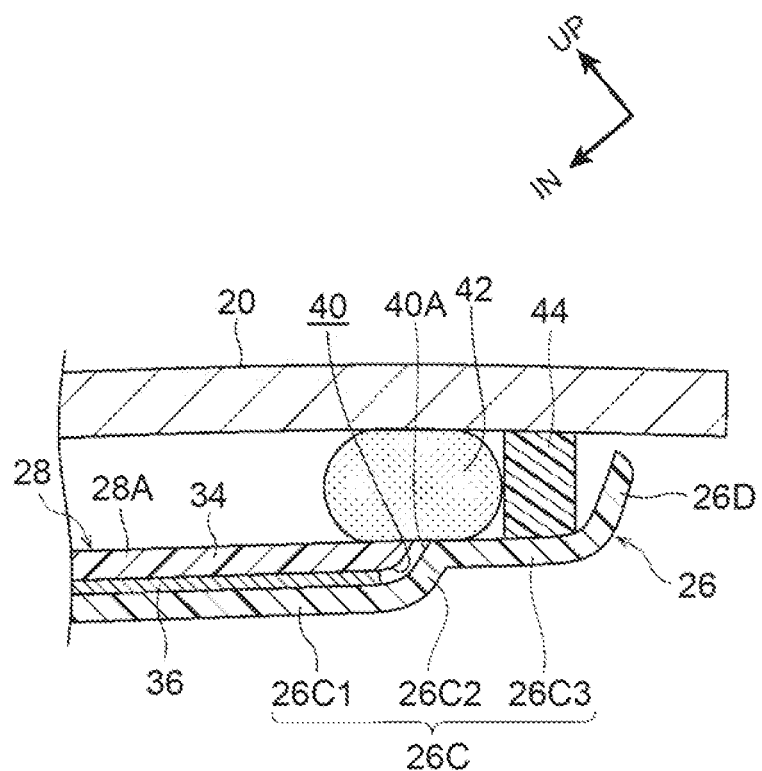
FIG. 3 is an enlarged sectional view of the main portions in FIG. 1.

Here, as shown enlarged in FIG. 3, the outer side upper wall portion 28A described above extends in the vehicle width direction in a substantially straight line along the rear window glass 20. Also, an outer side joint portion 34 as a second connecting portion is provided on a portion of the outer side upper wall portion 28A that is on the outside in the vehicle width direction.

Meanwhile, the inner side upper wall portion 26C described above includes an inner side joint portion 26C1 as a first joint portion that overlaps with the outer side joint portion 34, and an extended portion 26C3 that extends farther toward the outside in the vehicle width direction via a stepped portion 26C2 from an end portion of the inner side joint portion 26C1 that is on the outside in the vehicle width direction. The height of the stepped portion 26C2 is substantially the same as the dimension of the plate thickness of the outer side joint portion 34 plus the thickness of a hardened structural adhesive 36 that will be described later. Therefore, when the outer side joint portion 34 is in a state joined to the inner side joint portion 26C1, the surface of the outer side joint portion 34 and the surface of the extended portion 26C3 are positioned on the same plane.

The outer side joint portion 34 is joined to the inner side joint portion 26C1 by a structural adhesive 36 as a first adhering portion being applied to the inner side joint portion 26C1 and the outer side joint portion 34 then being overlapped with this structural adhesive 36. Similarly, the outer side lower wall portion 28C is joined to the inner side lower wall portion 26E by the structural adhesive 36, as shown in FIG. 1. With this structure, a closed sectional portion 38 is formed by the door inner panel 26 and the door outer panel 28. A high-strength low-elongation two component urethane adhesive, for example, may be used as the structural adhesive 36.

Also, returning to FIG. 3, in a state in which the outer side joint portion 34 is joined to the inner side joint portion 26C1, a gap 40 is formed between the inner side upper wall portion 26C and the outer side upper wall portion 28A. An open end 40A of the gap 40 is positioned between a tip end portion of the outer side joint portion 34 and the stepped portion 26C2 of the inner side upper wall portion 26C. A peripheral parts adhesive 42 is arranged as a second adhesive portion to close off the open end 40A of the gap 40. This peripheral parts adhesive 42 adheres to the extended portion 26C3 of the inner side upper wall portion 26C, the outer side joint portion 34, and the rear window glass 20 together. A one component urethane adhesive, for example, may be used as the peripheral parts adhesive 42.

Also, the peripheral parts adhesive 42 is more water resistant than the structural adhesive 36. A test regarding the level of water resistance is performed based on JISK6850 (tension adhesion strength test of adhesive). More specifically, two test pieces (each having a width of 25 mm, length of 200 mm, and a height of 0.8 mm, for example) corresponding to a first panel and a second panel are prepared, and these test pieces are joined together by the test adhesive with a joining allowance of 10 mm. Then adhered test pieces are immersed for a predetermined period of time (such as 10 days, for example) in hot water of a predetermined temperature (such as 60° C., for example), and after which a tension tensile water resistance test (tensile shear test) is performed at normal temperature. After the test is complete, the load generated at the time of fracture and the failure state are ascertained, and the level of water resistance is determined based on these. The generated load is unable to be completely determined due to the fact that the presumed input load differs depending on the part to be used (the intended purpose of the part), but it is be determined for each company when the part to be used is determined. There are three different kinds of failure states. If an interface failure occurs, in which a failure occurs at the boundary between one of the test pieces and the adhesive, the water resistance is given a low valuation. On the other hand, if a cohesion failure occurs, in which the adhesive itself fails, or if a material failure occurs, in which one of the test pieces itself fails, the water resistance is given a high valuation. When the test pieces are adhered together using the high-strength low-elongation two component urethane adhesive given as an example of the structural adhesive 36, interfacial peeling occurs. Therefore, the water resistance of the high-strength low-elongation two component urethane adhesive is given a low valuation. On the other hand, when the test pieces are adhered together using the one component urethane adhesive given as an example of the peripheral parts adhesive 42, cohesion failure occurs. Therefore, the resistance of the one component urethane adhesive is given a high valuation.

A dam member 44 is a water stop member outside the peripheral parts adhesive 42 in the vehicle width direction. The dam member 44 may be adjacent to the peripheral parts adhesive 42. The dam member 44 is arranged on the extended portion 26C3. As a result, a gap between the extended portion 26C3 and the rear window glass 20 is sealed.

The structure above is also the similar at the upper portion of the frame structure portion 22 shown in FIG. 2, so the same reference characters as those used in FIG. 1 will be used and a description will be omitted. The structure shown in FIG. 2 differs from the structure shown in FIG. 1 in that the member that is fixed to the inner side side wall upper portion 26A is not the ball joint 30, but is a door side fixing portion 46B of a door hinge 46 of the back door 12. The door hinge 46 includes a U-shaped hinge base 46A that is fixed to a vehicle body upper portion rear end 48 by a bolt 52, the door side fixing portion 46B that extends in a tangential direction from an upper end portion of the hinge base 46A, and a hinge pin, not shown, that rotatably supports a base end portion of the door side fixing portion 46B at the upper end portion of the hinge base 46A. This door side fixing portion 46B is fastened (fixed) to the inner side side wall upper portion 26A together with a hinge retainer via the bolt 52 and a nut 54.

Next, the operation and effects of the example embodiment will be described.

Both the door inner panel 26 and the door outer panel 28 are made of resin (CFRP). Also, the frame structure portion 22 is formed by the inner side joint portion 26C1 provided on the door inner panel 26 and the outer side joint portion 34 provided on the door outer panel 28 being joined together by the structural adhesive 36. This frame structure portion 22 defines the glass mounting opening 24, and the rear window glass 20 is arranged so as to close off this opening 24 from the vehicle outside.

Here, the structural adhesive 36 expands out in a state pressed between the inner side joint portion 26C1 and the outer side joint portion 34. In this example embodiment, the peripheral parts adhesive 42 is arranged so as to close off the open end 40A of the gap 40 formed between this inner side upper wall portion 26C and the outer side upper wall portion 28A. The peripheral parts adhesive 42 is adhered to the door inner panel 26, the door outer panel 28, and the rear window glass 20. As a result, water that gets in from outside the rear window glass 20 and condensation water that adheres to the inside of the rear window glass 20 are both kept out by the peripheral parts adhesive 42. That is, water is physically prevented from getting into the gap 40 formed at the joint between the inner side upper wall portion 26C and the outer side upper wall portion 28A by the peripheral parts adhesive 42. As a result, according to this example embodiment, water from outside the rear window glass 20, as well as condensation water that adheres to the inside of the rear window glass 20, are both able to be effectively prevented or inhibited from getting into the gap 40.

Also, in this example embodiment, the first adhering portion is the structural adhesive 36, so high rigidity is able to be obtained. Therefore, the frame structure portion 22 is able to be highly rigid even if the weight of the vehicle body is reduced by making at least one of the door inner panel 26 and the door outer panel 28 out of resin. As a result, according to this example embodiment, high rigidity of the frame structure portion 22 is able to be obtained without adding a metal reinforcing member, while reducing the weight of the vehicle body. Consequently, the support rigidity of the rear window glass 20 is able to be increased.

Furthermore, in this example embodiment, the peripheral parts adhesive 42 is more water resistant than the first adhesive portion (i.e., the structural adhesive 36). Therefore, water that has gotten in from outside the rear window glass 20 and condensation water that adheres to the inside of the rear window glass 20 are able to be prevented from getting into the gap 40 defined by the inner side upper wall portion 26C and the outer side upper wall portion 28A. That is, the peripheral parts adhesive 42 serves as a water stop (i.e., a seal). As a result, this example embodiment is able to obtain both an effect of physically preventing, by the peripheral parts adhesive 42, water from getting into the gap 40 defined by the inner side upper wall portion 26C and the outer side upper wall portion 28A, and an effect of stopping water by the property of the peripheral parts adhesive 42. In particular, having the peripheral parts adhesive 42 effectively prevent or inhibit water from getting in enables interfacial peeling between the structural adhesive 36 and the door inner panel 26 or the door outer panel 28 to be prevented.

To elaborate on this, when making vehicle body parts such as the back door that are usually made of metal, out of resin to reduce weight, it is conceivable to employ a closed sectional structure formed by a plurality of parts, and use a highly rigid structural adhesive to join these parts together in order to ensure rigidity equivalent to that of metal. However, in an environment in which the structural adhesive (particularly a urethane adhesive) is covered with water, interfacial peeling may occur between the member and the structural adhesive, and as a result, adhesive performance may not be able to be sufficiently displayed. Therefore, from the viewpoint of ensuring stable strength quality, care must be paid so that water does not penetrate the adhesive portion. In contrast, in this example embodiment, water is inhibited from getting into and collecting in the gap 40, by the peripheral parts adhesive 42 that is highly water resistant closing off the open end 40A of the gap 40, thereby avoiding a state in which water contacts the structural adhesive 36. As a result, interfacial peeling is able to be prevented from occurring between the peripheral parts adhesive 42 and the door inner panel 26 or the door outer panel 28.

Also, in this example embodiment, when the outer side joint portion 34 of the door outer panel 28 is arranged on the inner side joint portion 26C1 of the door inner panel 26, the open end 40A of the gap 40 described above is arranged between the end portion of the outer side joint portion 34 and the stepped portion 26C2 of the door inner panel 26. In this state, the peripheral parts adhesive 42 is adhered to the end portion of the outer side joint portion 34, the extended portion 26C3 of the door inner panel 26, and the rear window glass 20, and the open end 40A of the gap 40 is closed off by the peripheral parts adhesive 42. With this kind of example embodiment, a step does not easily form between the extended portion 26C3 of the door inner panel 26 and the outer side joint portion 34 of the door outer panel 28, so these are able to be made flush by setting the height of the stepped portion 26C2. Consequently, a worker is able to easily arrange the peripheral parts adhesive 42 on the extended portion 26C3 of the door inner panel 26 and the outer side joint portion 34 of the door outer panel 28. As a result, according to this example embodiment, workability with respect to the application of the peripheral parts adhesive 42 that is the process before assembling the rear window glass 20 to the door inner panel 26 and the door outer panel 28 is able to be improved, and the work time of this application is able to be shortened.

Moreover, in this example embodiment, the peripheral parts adhesive 42 is arranged closing off the open end 40A of the gap 40. In other words, the peripheral parts adhesive 42 does not need to be filled into the gap 40, so the amount of peripheral parts adhesive 42 that is applied (used) is able to be reduced. Thus, according to this example embodiment, water that gets in from outside the rear window glass 20 and condensation water that adheres to the inside surface of the rear window glass 20 is able to be effectively inhibited or prevented from penetrating to the structural adhesive 36 side, while the cost required for the peripheral parts adhesive 42 is able to be kept down.

Also, in this example embodiment, if water from outside the rear window glass 20 tries to get in, this water is first inhibited from getting in by the dam member 44. Therefore, water from outside the rear window glass 20 is able to be more effectively prevented from getting in.

Next, a second example embodiment of the vehicle body structure according to the invention will be described with reference to FIGS. 5 and 6. Component parts similar to those in the first example embodiment described above will be denoted by like reference characters, and descriptions thereof will be omitted.

In the second example embodiment, variations of the structures of the first joint portion and the second joint portion will be described.

FIG. 5 is a view of a first variation. In the first variation, a door inner panel 60 as a first panel is formed in a flat plate shape without any step. FIG. 5 is a view showing a frame format of FIG. 3. That is, the door inner panel 60 includes a first joint portion 60A, and an extended portion 60B that is adjacent to the first joint portion 60A and is arranged on the same plane as the first joint portion 60A. A second joint portion 62A of a door outer panel 62 is jointed to the first joint portion 60A of the door inner panel 60 by the structural adhesive 36. Therefore, the second joint portion 62A overlaps with the first joint portion 60A via the structural adhesive 36. Also, the open end 40A of the gap 40 described in the first example embodiment is arranged between an end portion of the second joint portion 62A of the door outer panel 62 and the first joint portion 60A of the door inner panel 60. Moreover, the end portion of the second joint portion 62A and the extended portion 60B of the door inner panel 60 are joined, together with the rear window glass 20, by the peripheral parts adhesive 42.

According to this structure, when the second joint portion 62A of the door outer panel 62 is arranged on the first joint portion 60A of the door inner panel 60, the open end 40A of the gap 40 described above is arranged between the end portion of the second joint portion 62A and the first joint portion 60A of the door inner panel 60. In this state, the peripheral parts adhesive 42 is adhered to the end portion of the second joint portion 62A, the extended portion 60B of the door inner panel 60, and the rear window glass 20, and closes off the open end 40A of the gap 40. In this way, in the first variation of this example embodiment, the extended portion 60B of the door inner panel 60 and the second joint portion 62A of the door outer panel 62 are able to be joined, together with the rear window glass 20, by the peripheral parts adhesive 42, even if the door inner panel 60 does not undergo a process to form a step or the like thereon. Therefore, a processing operation of the door inner panel 60 is able to be omitted. As a result, according to the first variation of this example embodiment, productivity of the back door 12 is able to be improved, and the cost is able to be reduced accordingly.

FIG. 6 is a view of a second variation. In the second variation, a first joint portion 70A of a door inner panel 70 and a second joint portion 72A of a door outer panel 72 are arranged on the same plane across a gap 74 of a predetermined width.

Figure 6A:
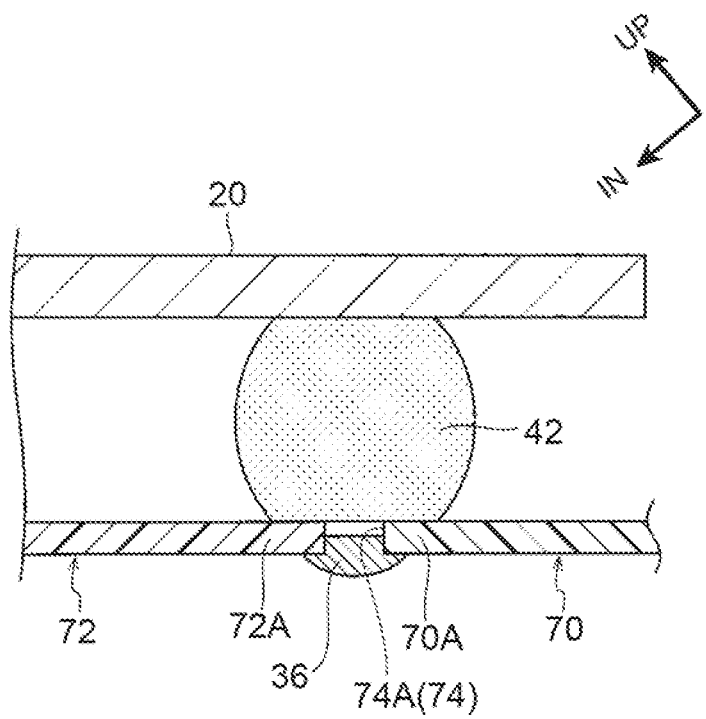
FIG. 6A is an enlarged view corresponding to FIG. 5, which shows a frame format of a joint structure according to a second variation of the second example embodiment.

Furthermore, in an example shown in FIG. 6A, the first joint portion 70A and the second joint portion 72A are joined together by the structural adhesive 36 being filled into a portion of the gap 74 from the side opposite the rear window glass 20. Moreover, the peripheral parts adhesive 42 is adhered to the first joint portion 70A, the second joint portion 72A, and the rear window glass 20. As a result, an open end 74A of the gap 74 is closed off by the peripheral parts adhesive 42.

Figure 6B:
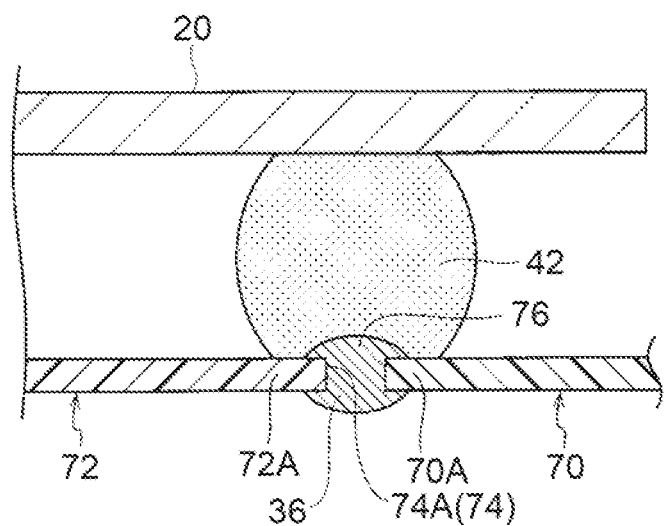
FIG. 6B is an enlarged view of a similar structure (a modified example) of the joint structure shown in FIG. 6A.

Meanwhile, in an example shown in FIG. 6B, the first joint portion 70A and the second joint portion 72A are joined together by the structural adhesive 36 being filled into all of the gap 74. In a state in which the first joint portion 70A and the second joint portion 72A are joined together, the structural adhesive 36 overflows from the open end 74A of the gap 74 and hardens in a state accumulated on both sides of the gap 74. Then, the peripheral parts adhesive 42 is further filled on a portion 76 where the structural adhesive 36 has accumulated, such that the first joint portion 70A, the second joint portion 72A, and the rear window glass 20 are joined together. In this case, the open end 74A of the gap 74 is covered by the peripheral parts adhesive 42 (via the structural adhesive 36).

According to this structure, the first joint portion 70A of the door inner panel 70 and the second joint portion 72A of the door outer panel 72 are arranged on the same plane across the gap 74, and the structural adhesive 36 is filled into a portion or all of this gap 74. As a result, the door inner panel 70 and the door outer panel 72 are joined together. Further, in this state, the open end 74A of the gap 74 is closed off (in the case of FIG. 6A) or covered (in the case of FIG. 6B) by the peripheral parts adhesive 42 being adhered to the first joint portion 70A, the second joint portion 72A, and the rear window glass 20. In this way, in the second variation of this example embodiment, water is able to be inhibited or prevented from penetrating to the structural adhesive 36 side, even if the first joint portion 70A of the door inner panel 70 and the second joint portion 72A of the door outer panel 72 do not overlap. Also, in this case, the first joint portion 70A and the second joint portion 72A are able to be made flush, so a worker is able to easily arrange the peripheral parts adhesive 42 on the first joint portion 70A of the door inner panel 70 and the second joint portion 72A of the door outer panel 72. Furthermore, neither the first joint portion 70A of the door inner panel 70 nor the second joint portion 72A of the door outer panel 72 needs to undergo special processing, so a processing operation of the panel is able to be omitted.

In addition, the positional relationship of the structural adhesive 36 and the peripheral parts adhesive 42 is such that they overlap when viewed from the rear window glass 20 side, so an effect in which the peripheral parts adhesive 42 directly adds to the joining (adhering) effect of the first joint portion 70A and the second joint portion 72A by the structural adhesive 36 is able to be obtained. That is, the gap 74 between the first joint portion 70A and the second joint portion 72A is set narrow, so even if the structural adhesive 36 is filled into the gap 74, the adhesion range (area) thereof is limited. However, the peripheral parts adhesive 42 joins (adheres) the first joint portion 70A and the second joint portion 72A together in a position overlapping with the structural adhesive 36 when viewed from the rear window glass 20 side, so the peripheral parts adhesive 42 is able to add to the adhesive force of the structural adhesive 36.

Thus, according to the second variation of this example embodiment, the joining force (adhesive force) between the first joint portion 70A and the second joint portion 72A by the structural adhesive 36 is able to be reinforced by the peripheral parts adhesive 42.

Next, a third example embodiment of the vehicle body structure according to the invention will be described with reference to FIGS. 7 and 8. Component parts similar to those in the first example embodiment and the like described above will be denoted by like reference characters, and descriptions thereof will be omitted.

In this third example embodiment, a variation of the second adhering portion will be described.

Figure 7:
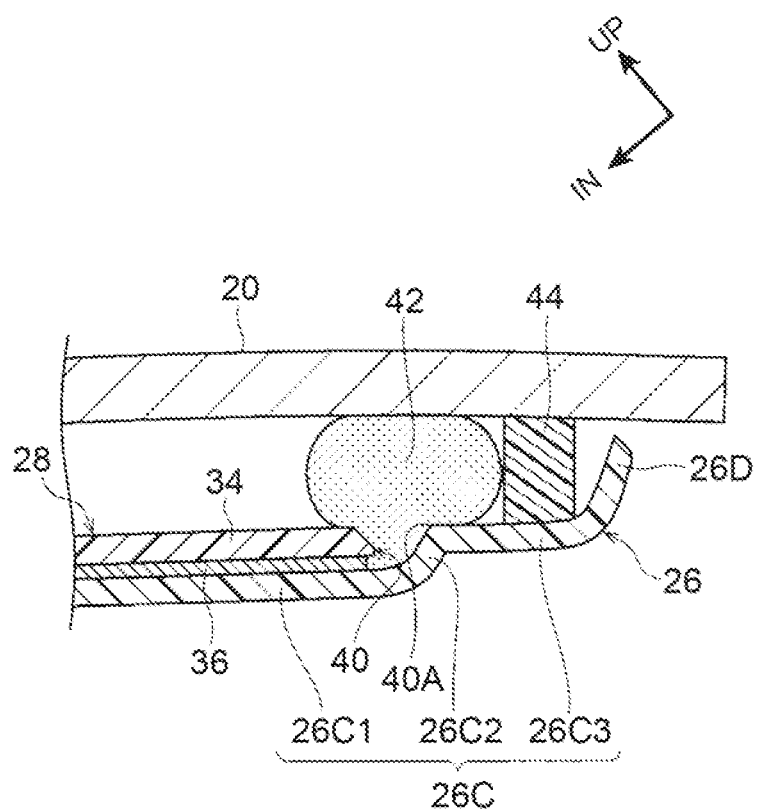
FIG. 7 is an enlarged view corresponding to FIG. 3, which shows a frame format of a joint structure according to a first variation of a third example embodiment of the invention.

FIG. 7 is a view of a first variation. In this first variation, the structure of the first joint portion of the door inner panel 26 and the second joint portion of the door outer panel 28 (i.e., the way in which the panels are joined) is substantially the same as it is in the first example embodiment described above. That is, the door inner panel 26 includes the inner side joint portion 26C1, the stepped portion 26C2, and the extended portion 26C3, and the outer side joint portion 34 of the door outer panel 28 is joined by the structural adhesive 36 to the inner side joint portion 26C1.

However, an end portion (a portion facing the stepped portion 26C2) of the outer side joint portion 34 is cut so as to be inclined in the opposite direction from the inclining direction of the stepped portion 26C2. As a result, although the gap 40 is formed at the connection between the outer side joint portion 34 and the inner side joint portion 26C1 when the outer side joint portion 34 is joined to the inner side joint portion 26C1, the open end 40A of the gap 40 has a general V-shape, which differs from the first example embodiment. Furthermore, the peripheral parts adhesive 42 is adhered to the inner side joint portion 26C1, the outer side joint portion 34, and the rear window glass 20, and a portion is filled inside the gap 40. The peripheral parts adhesive 42 that is filled inside the gap 40 contacts the structural adhesive 36.

According to this structure, the peripheral parts adhesive 42 is filled inside the gap 40 from the open end 40A of the gap 40, so the adhesion area of the door inner panel 26 and the door outer panel 28 increases by that amount. As a result, the joining strength between the door inner panel 26 and the door outer panel 28 is able to be increased.

In this example embodiment, the peripheral parts adhesive 42 contacts the structural adhesive 36, but the structure is not limited to this. A structure in which the peripheral parts adhesive 42 is filled inside the gap 40 but does not contact the structural adhesive 36 may also be employed.

Figure 8:
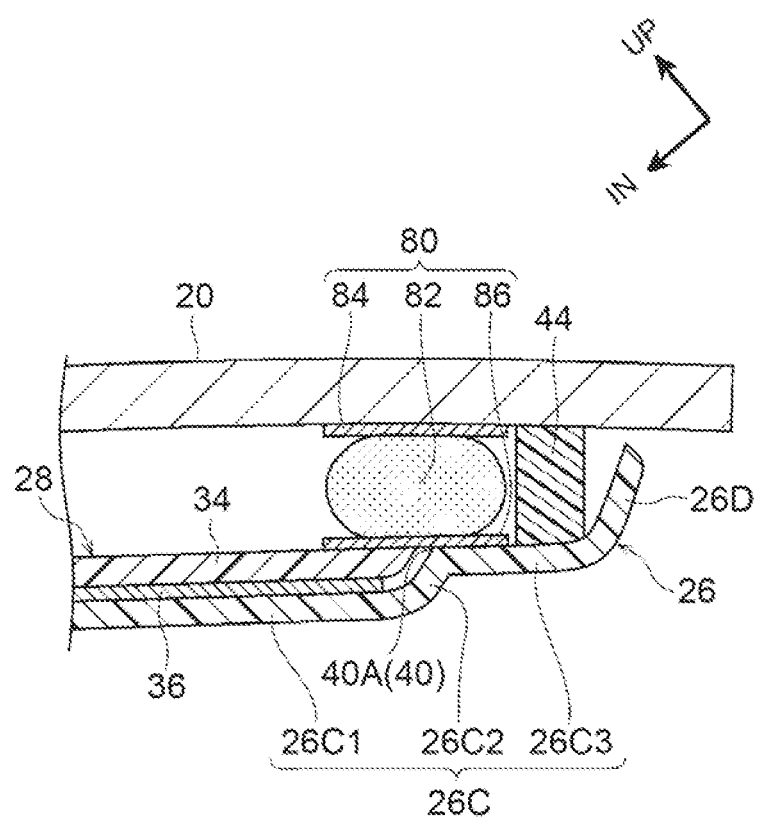
FIG. 8 is an enlarged view corresponding to FIG. 3, which shows a frame format of a joint structure according to a second variation of the third example embodiment.

FIG. 8 is a view of a second variation. In this second variation, the structure of the first joint portion of the door inner panel 26 and the second joint portion of the door outer panel 28 (i.e., the way in which the panels are connected) is substantially the same as it is in the first example embodiment described above. That is, the door inner panel 26 includes the inner side joint portion 26C1, the stepped portion 26C2, and the extended portion 26C3, and the outer side joint portion 34 of the door outer panel 28 is joined by the structural adhesive 36 to the inner side joint portion 26C1. The gap 40 is formed between the inner side joint portion 26C1 and the outer side joint portion 34 when the outer side joint portion 34 is joined to the inner side joint portion 26C1. The open end 40A of the gap 40 is positioned between the tip end portion of the outer side joint portion 34 and the stepped portion 26C2 of the inner side upper wall portion 26C. A second adhesive portion 80 is arranged so as to close off the open end 40A of the gap 40. This second adhesive portion 80 is adhered to the extended portion 26C3 of the door inner panel 26, the outer side joint portion 34, and the rear window glass 20.

The second adhesive portion 80 includes an elastic body 82 arranged between the door inner panel 26 and the door outer panel 28, and the rear window glass 20, a first adhesive member 84 that is adhered to both this elastic body 82 and the rear window glass 20 and seals a gap between these two, and a second adhesive member 86 that is adhered to the elastic body 82, and the door inner panel 26 and the door outer panel 28 and seals a gap between these. The elastic body 82 is formed by rubber material, for example. Also, the first adhesive member 84 and the second adhesive member 86 are formed by double-faced tape, for example.

According to this structure, the first adhesive member 84 is adhered to the rear window glass 20, and the second adhesive member 86 is adhered to both the door inner panel 26 and the door outer panel 28. As a result, a gap between the first adhesive member 84 and the rear window glass 20 is sealed, and a gap between the second adhesive member 86, and the door inner panel 26 and the door outer panel 28 is sealed. Furthermore, the elastic body 82 is interposed between the first adhesive member 84 and the second adhesive member 86. Therefore, road surface input transmitted to the frame structure portion 22 when the vehicle is traveling is damped by the elastic body 82. As a result, according to this example embodiment, vibration of the rear window glass 20 when the vehicle is traveling is able to be effectively suppressed.

Figure 9:
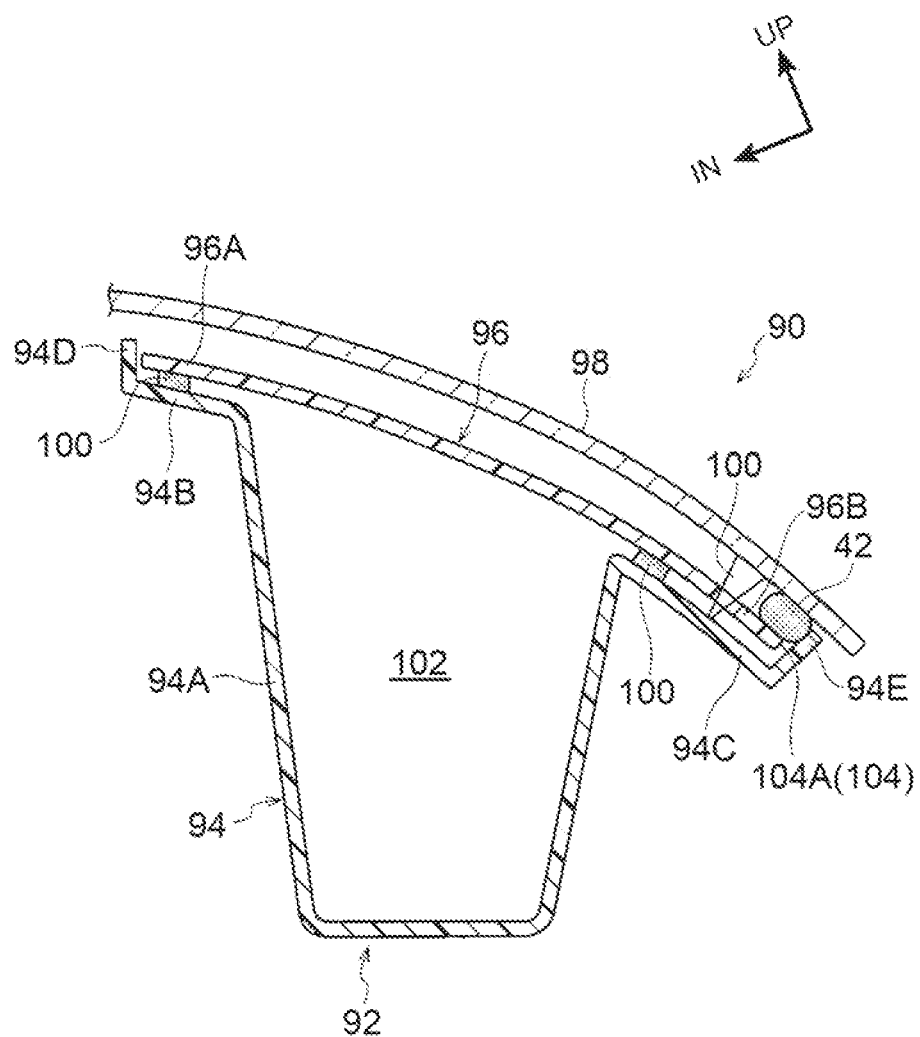
FIG. 9 is an enlarged view corresponding to FIG. 1, which shows a frame format of a joint structure according to a back door according to a fourth example embodiment of the invention.

Next, a fourth example embodiment of the vehicle body structure according to the invention will be described with reference to FIG. 9. Component parts similar to those in the first example embodiment and the like described above will be denoted by like reference characters, and descriptions thereof will be omitted.

This fourth example embodiment is similar to the first example embodiment described above in that a frame structure portion 92 of a back door 90 is formed by a door inner panel 94 and a door outer panel 96, but differs from the first example embodiment in that the sectional structure is somewhat different. More specifically, the sectional shape of the door inner panel 94 is a hat-shape and has a main body portion 94A that has a U-shaped sectional shape in which an open side end portion faces a rear window glass 98, a pair of left and right flange portions 94B and 94C that protrude out away from each other along the rear window glass 98 from both end portions of this main body portion 94A, and a pair of left and right vertical wall portions 94D and 94E that bent toward the rear window glass 98 from the end portions of these flange portions 94B and 94C. The left and right flange portions 94B and 94C serve as the first joint portion of the door inner panel 94, i.e., second joint portions 96A and 96B are joined together by a low-strength high-elongation urethane adhesive 100. As a result, a closed sectional portion 102 is formed in the frame structure portion 92. The low-strength high-elongation urethane adhesive 100 is not a structural adhesive, but rather is classified as a peripheral parts adhesive. The rear window glass 98 is also joined to a second joint portion 96B of the door outer panel 96 by the same low-strength high-elongation urethane adhesive 100.

Here, an open end of a gap formed in a joint (a seam) between the door inner panel 94 and the door outer panel 96 described above, i.e., an open end 104A of a gap 104 formed between the vertical wall portion 94E formed on an outside end portion, in the vehicle width direction, of the door inner panel 94, and the second joint portion 96B of the door outer panel 96, is closed off by the peripheral parts adhesive 42. More specifically, the vertical wall portion 94E, the end portion on the vehicle outside in the vehicle width direction of the second joint portion 96B, and the outside end portion of the rear window glass 98 in the vehicle width direction are joined together by the peripheral parts adhesive 42 being applied or filled so as to extend between the vertical wall portion 94E, the end portion on the vehicle outside in the vehicle width direction of the second joint portion 96B, and the outside end portion of the rear window glass 98 in the vehicle width direction. As a result, the open end 104A of the gap 104 formed between the vertical wall portion 94E and the second joint portion 96B is closed off by the peripheral parts adhesive 42.

According to this structure, the manner of ensuring rigidity with respect to the frame structure portion 92 of the back door 90 differs from that of the frame structure portion 22 described in the first to the third example embodiments described above. That is, in this example embodiment, the flange portions 94B and 94C of the door inner panel 94 are joined to the second joint portions 96A and 96B of the door outer panel 96 by the low-strength high-elongation urethane adhesive 100, so the rigidity of the frame structure portion 92 is lower than that of the frame structure portion 22 of the first to the third example embodiments described above. Therefore, the rigidity of the frame structure portion 92 is ensured by setting a reinforcing member, not shown, on the frame structure portion 92. Even with the frame structure portion 92 structured in this way, by joining the vertical wall portion 94E of the door inner panel 94, and the second joint portion 96B of the door outer panel 96 and the rear window glass 98 together, water that has gotten in from outside the rear window glass 98 and condensation water that has adhered to the inside of the rear window glass 98 is stopped by the peripheral parts adhesive 42. Because the water resistance of the peripheral parts adhesive 42 is high, the water will not get into the gap 104, so the low-strength high-elongation urethane adhesive 100 will not become soaked in the water. Therefore, the basic effect of the first example embodiment and the like described above is also able to be obtained with this example embodiment as well.

Also, with this example embodiment, the door inner panel 94 is provided with the vertical wall portion 94E that is bent toward the rear window glass 98 side from the end portion of the flange portion 4C, so this vertical wall portion 94E is able to be used as a water stop wall. As a result, with this example embodiment, the water stop member is able to be eliminated, so the cost is able to be reduced accordingly.

When the second adhesive portion 80 of the second variation of the third example embodiment described above is applied to this example embodiment, the second joint portion 96B and the vertical wall portion 94E may be joined together by extending the second adhesive member 86 so that it extends between the two.

Hereinafter, the example embodiment described above will be elaborated on. In the example embodiment described above, the invention is applied to the back door 12 as one example of the vehicle body structure, but it is not limited to this. That is, at least one panel, of the first panel and the second panel, may be applied to a portion where a windowpane is joined to a frame structure portion made of resin. For example, the invention may also be applied to a joint between a fixed window and a frame portion that supports this fixed window in a side door, or a joint between a sunroof and a frame support portion that supports this sunroof, in a roof of a minivan.

Also, taking the first example embodiment as an example, both the door inner panel 26 and the door outer panel 28 are made of resin, but they are not limited to this. That is, it is sufficient to have at least one panel, of the first panel and the second panel, be made of resin. Therefore, at least one of the first panel and the second panel may be made of resin, and the other of the first panel and the second panel may be made of metal such as steel sheet or aluminum alloy sheet.

Moreover, in the example embodiment described above, the vehicle body structure according to the invention is applied to a back door, but the vehicle body structure according to the invention may also be applied to a vehicle outer panel of a hood, a roof, or a luggage door or the like.

The structure below provides a vehicle body structure capable of effectively preventing or inhibiting both water from outside a vehicle outer sheet member, and condensation water that adheres to the inside of a vehicle outer sheet member, from getting in.

One of the embodiments of the present invention may be "a vehicle body structure including a frame structure portion configured to define an opening, the frame structure portion including a first panel having a first joint portion, a second panel having a second joint portion, and a first adhesive portion that adheres to the first joint portion and the second joint portion; a vehicle outer sheet member that is provided on a vehicle outside of the opening and that covers the opening; and a second adhesive portion that adheres to the first panel, the second panel, and the vehicle outer sheet member, wherein at least one of the first panel and the second panel is made of resin, the second adhesive portion is arranged closing off or covering an open end of a gap in a joint between the first panel and the second panel, and the first adhesive portion is arranged within the gap."

Applying this structure to a hood of a vehicle is advantageous in that water is able to be prevented from getting into a power unit compartment and onto auxiliary equipment, and applying the invention to a luggage door is advantageous in that water is able to be prevented from getting on luggage and the like stored in the luggage compartment.

What is claimed is:

1. A vehicle body structure comprising:
   a frame structure portion configured to define an opening, the frame structure portion including
      a first panel having a first joint portion,
      a second panel having a second joint portion, and
      a first adhesive portion that adheres to the first joint portion and the second joint portion:
   a windowpane that is provided on a vehicle outside of the opening and that covers the opening; and
   a second adhesive portion that adheres to the first panel, the second panel, and the windowpane, wherein
   at least one of the first panel and the second panel is made of resin,
   the second adhesive portion is arranged closing off or covering an open end of a gap in a joint between the first panel and the second panel,
   the first adhesive portion is arranged within the gap,
   the first panel includes an extended portion that extends in a direction toward an end portion of the windowpane via a stepped portion from the first joint portion,
   the extended portion is arranged such that the open end is positioned between an end portion of the second joint portion and the stepped portion, and
   the second adhesive portion adheres to the end portion of the second joint portion, the extended portion, and the windowpane.

2. The vehicle body structure according to claim 1, wherein
   the first adhesive portion is a structural adhesive.

3. The vehicle body structure according to claim 1, wherein
   water resistance of the second adhesive portion is higher than the water resistance of the first adhesive portion.

4. The vehicle body structure according to claim 1, wherein
   the second adhesive portion is an adhesive, and the second adhesive portion is arranged closing off the open end of the gap.

5. The vehicle body structure according to claim 1, wherein
   the second adhesive portion is an adhesive, and the second adhesive portion is filled in the gap from the open end of the gap.

6. The vehicle body structure according to claim 1, wherein
   the second adhesive portion includes:

an elastic body that is arranged between the first panel, the second panel, and the windowpane;

a first adhesive member that adheres to the elastic body and the windowpane, and seals a gap between the elastic body and the windowpane; and a second adhesive member that seals a gap between the elastic body and the first panel, and a gap between the elastic body and the second panel.

7. The vehicle body structure according to claim 1, wherein the first panel is a door inner panel that is made of resin, the door inner panel being a part of a back door and facing a vehicle interior, the second panel is a door outer panel that is made of resin, the door outer panel being a part of the back door and facing a vehicle exterior, and the windowpane is a rear window glass of the back door.

8. A vehicle body structure comprising:

a frame structure portion configured to define an opening, the frame structure portion including a first panel having a first joint portion, a second panel having a second joint portion, and a first adhesive portion that adheres to the first joint portion and the second joint portion:

a windowpane that is provided on a vehicle outside of the opening and that covers the opening; and a second adhesive portion that adheres to the first panel, the second panel, and the windowpane, wherein at least one of the first panel and the second panel is made of resin, the second adhesive portion is arranged closing off or covering an open end of a gap in a joint between the first panel and the second panel, the first adhesive portion is arranged within the gap, and the first panel includes an extended portion that is adjacent to the first joint portion, and is arranged on the same plane as the first joint portion, the open end of the gap is arranged between an end portion of the second joint portion and the first joint portion, and the second adhesive portion adheres to the end portion of the second joint portion, the extended portion, and the windowpane.

9. A vehicle body structure comprising:

a frame structure portion configured to define an opening, the frame structure portion including a first panel having a first joint portion, a second panel having a second joint portion, and a first adhesive portion that adheres to the first joint portion and the second joint portion;

a windowpane that is provided on a vehicle outside of the opening and that covers the opening; and a second adhesive portion that adheres to the first panel, the second panel, and the windowpane, wherein at least one of the first panel and the second panel is made of resin, the second adhesive portion is arranged closing off or covering an open end of a gap in a joint between the first panel and the second panel, and the first adhesive portion is arranged within the gap, the vehicle body structure further comprising:

a dam member that is provided farther on an end portion side of the windowpane than the second adhesive portion, and seals a gap between the first panel and the windowpane.

10. The vehicle body structure according to claim 9, wherein the first joint portion and the second joint portion are arranged on the same plane across the gap, and the first joint portion and the second joint portion are joined together by the first adhesive portion being filled in a portion or all of the gap, and the second adhesive portion adheres to the first joint portion, the second joint portion, and the windowpane.

11. The vehicle body structure according to claim 9, wherein the first panel includes a vertical wall portion that is bent toward the windowpane from an end portion of the first joint portion, the open end of the gap is arranged between an end portion of the second joint portion and the vertical wall portion, and the second adhesive portion adheres to the vertical wall portion, the end portion of the second joint portion, and the windowpane.

* * * * *